US012460304B2

(12) United States Patent
Schaus et al.

(10) Patent No.: US 12,460,304 B2
(45) Date of Patent: Nov. 4, 2025

(54) PHOSPHATE-FREE CLEANER FOR METALLIC SURFACES WITH REDUCED PICKLING EROSION

(71) Applicant: CHEMETALL GMBH, Frankfurt am Main (DE)

(72) Inventors: Andre Schaus, Frankfurt am Main (DE); Dominic Weil, Frankfurt am Main (DE)

(73) Assignee: CHEMETALL GMBH, Frankfurt (DE)

( * ) Notice: Subject to any disclaimer, the term of this patent is extended or adjusted under 35 U.S.C. 154(b) by 766 days.

(21) Appl. No.: 17/600,646

(22) PCT Filed: Mar. 20, 2020

(86) PCT No.: PCT/EP2020/057775

§ 371 (c)(1),
(2) Date: Oct. 1, 2021

(87) PCT Pub. No.: WO2020/200838

PCT Pub. Date: Oct. 8, 2020

(65) Prior Publication Data

US 2022/0162760 A1 May 26, 2022

(30) Foreign Application Priority Data

Apr. 4, 2019 (EP) .................................... 19167342

(51) Int. Cl.

| | |
|---|---|
| ***C11D 3/37*** | (2006.01) |
| ***C09D 5/08*** | (2006.01) |
| ***C09D 5/44*** | (2006.01) |
| ***C11D 1/66*** | (2006.01) |
| ***C11D 7/04*** | (2006.01) |
| ***C11D 7/26*** | (2006.01) |
| ***C23C 22/34*** | (2006.01) |
| ***C23G 1/16*** | (2006.01) |

(52) U.S. Cl.

CPC ................. *C23G 1/16* (2013.01); *C09D 5/08* (2013.01); *C09D 5/4411* (2013.01); *C09D 5/4415* (2013.01); *C11D 1/66* (2013.01); *C11D 3/3765* (2013.01); *C11D 7/26* (2013.01); *C23C 22/34* (2013.01)

(58) Field of Classification Search

CPC ............ C11D 1/66; C11D 3/3765; C11D 7/26
USPC ................ 510/245, 255, 475, 477, 488, 505
See application file for complete search history.

(56) References Cited

U.S. PATENT DOCUMENTS

| | | | | |
|---|---|---|---|---|
| 9,139,799 | B1 * | 9/2015 | Parte | C11D 7/3245 |
| 9,567,552 | B2 | 2/2017 | Olson et al. | |
| 10,154,771 | B2 * | 12/2018 | Kelly-Murray | A47L 15/0015 |
| 2011/0207646 | A1 * | 8/2011 | Baez Chavez | C11D 3/38672 510/226 |
| 2014/0179585 | A1 * | 6/2014 | Souter | C11D 3/37 510/226 |

FOREIGN PATENT DOCUMENTS

| | | | | |
|---|---|---|---|---|
| AU | 2013337255 A1 * | 4/2015 | C11D 3/386 |
| CA | 2315889 A1 * | 2/2001 | C11D 17/065 |
| EP | 0672764 A1 | 9/1995 | |
| EP | 1111037 * | 6/2001 | C11D 17/043 |
| EP | 2333042 A1 * | 6/2011 | C11D 1/66 |
| GB | 2358405 A * | 7/2001 | C11D 17/0078 |
| JP | 2938840 B2 | 8/1999 | |
| JP | 2006002229 A | 1/2006 | |
| WO | WO-03042347 A1 * | 5/2003 | C11D 17/042 |
| WO | WO-2004018611 A1 * | 3/2004 | C11D 17/003 |
| WO | WO-2004045783 A2 * | 6/2004 | C11D 11/0035 |
| WO | 2013142457 A1 | 9/2013 | |
| WO | 2017186931 A1 | 11/2017 | |
| WO | 2017202891 A1 | 11/2017 | |
| WO | 2017220632 A1 | 12/2017 | |
| WO | WO-2020018891 A1 * | 1/2020 | C11D 1/29 |

OTHER PUBLICATIONS

International Search Report for corresponding PCT/EP2020/057775 mailed Aug. 25, 2020, 3 Pages.
European Search Report for EP Patent Application No. 19167342.5, Issued on Sep. 10, 2019, 4 pages.

* cited by examiner

*Primary Examiner* — Gregory R Delcotto
(74) *Attorney, Agent, or Firm* — Armstrong Teasdale LLP

(57) ABSTRACT

Described herein is a water-based, alkaline cleaner concentrate for producing a cleaner for metallic surfaces, the concentrate including a) at least one (meth)acrylic acid homopolymer having a weight-average molar mass in the range from 3 000 to 19 000 g/mol and b) at least one (meth)acrylic acid copolymer having a weight-average molar mass in the range from 50 000 to 100 000 g/mol. Also described herein are a corresponding cleaner for metallic surfaces with reduced pickling erosion, a process for anti-corrosive treatment of metallic surfaces that includes a corresponding cleaning step, a metallic surface obtained by the process, and a method of use thereof in the sector of the metalworking industries.

11 Claims, No Drawings

PHOSPHATE-FREE CLEANER FOR METALLIC SURFACES WITH REDUCED PICKLING EROSION

CROSS-REFERENCE TO RELATED APPLICATIONS

This application is a U.S. National Phase Application of International Patent Application No. PCT/EP2020/057775, filed Mar. 20, 2020, which claims priority to European Patent Application No. 19167342.5, filed Apr. 4, 2019, the entire contents of which are hereby incorporated by reference herein.

The present invention relates to a water-based, alkaline cleaner concentrate and to a corresponding cleaner for metallic surfaces with reduced pickling erosion, said concentrate or said cleaner operating without the use of phosphates, and also to a process for anticorrosive treatment of metallic surfaces that comprises a corresponding cleaning step, to a metallic surface obtainable by said process, and to the use thereof in the sector of the metalworking industries.

Phosphate-containing cleaner products have already been long used as standard products in industrial metal cleaning on account of their action in accelerating degreasing. In addition to their degreasing action, phosphates here also offer the advantage of acting as complexing agents for interfering ions such as magnesium or calcium.

The anticorrosive pretreatment of metal strips and also metallic components, in vehicle construction or in general industry, for example, employs aqueous cleaning systems and also conversion solutions which have a pH in the significantly acidic or alkaline range.

During cleaning itself, therefore, there is what is called a pickling attack, which can attack not only oxide films but also the base material, whose morphology it may adversely affect. This may have consequences for the subsequent deposition of a conversion coating, leading possibly in turn to reduced adhesiveness of subsequent coatings, especially cathodic electrocoat materials, and hence possibly adversely affecting corrosion control.

For this reason, the standard phosphate-containing products have often been combined with silicate compounds as corrosion inhibitors to protect sensitive materials such as galvanized steels, aluminum or aluminum-containing substrates from excessive stress during the cleaning operation.

At a pH of less than 11, however, silicate compounds such as potassium and sodium silicates and also potassium and sodium waterglasses exhibit a tendency to precipitate and therefore to lose their activity, and may lead, furthermore, to crusts in the cleaner baths or to a dried deposition on the metal surfaces for treatment that is subsequently difficult to remove and visually disruptive. Nowadays, therefore, such compounds are not popularly used as pickling inhibitors in alkaline cleaner systems.

Substitutes now used for silicate compounds particularly in the case of aluminum and galvanized steels are boron compounds such as boric acid or sodium or potassium borate.

For a number of years, however, there has been an increasing trend apparent toward safer and more sustainable cleaner compositions. Drivers of this trend include, firstly, statutory regulations prohibiting the use of certain ingredients, increasingly, in various countries (e.g. China) or territories, such ingredients including phosphates and also complexing agents, such as EDTA and, secondly, the increasing environmental and safety-conscious thinking of the users.

Given that this trend is recorded with conversion systems as well, there is an increased focus on organosilane-based thin-film systems such as Oxsilane (Chemetall GmbH, Germany). Like zinc phosphating, these systems act as an aqueous conversion system, but have clear advantages particularly in relation to more sustainable products, environmental thinking, and prohibitions on raw materials, such as on nickel or phosphate.

Aqueous cleaners nowadays are therefore required to exhibit high compatibility not only with established conversion processes such as trication phosphating but also with nickel-free zinc phosphating and in particular with the aforementioned thin-film systems, being therefore required to prepare the metal surface optimally for every kind of conversion treatment.

U.S. Pat. No. 9,567,552 B2 describes a phosphate-free cleaner in which long-chain polyacrylates are used as corrosion inhibitors. The cleaner is suitable for treating aluminum/aluminum alloys, but not for multimetal systems of the kind customary in the automobile industry, for example. The compatibility of the cleaner with a subsequent organosilane-based thin-film coating or a trication phosphating system is not expounded.

It was an object of the present invention, therefore, to provide a water-based cleaner concentrate and also a corresponding water-based cleaner for metallic surfaces that firstly operates without the use of phosphates, while linking a balanced pickling attack with good cleaning performance, and that secondly prepares the metal surface optimally for any kind of conversion treatment.

This object is achieved by a water-based, alkaline cleaner concentrate for producing a cleaner for metallic surfaces, which comprises a) at least one (meth)acrylic acid homopolymer having a weight-average molar mass in the range from 3 000 to 19 000 g/mol and b) at least one (meth)acrylic acid copolymer having a weight-average molar mass in the range from 50 000 to 100 000 g/mol, where the at least one (meth)acrylic acid copolymer comprises at least one copolymer of (meth)acrylic acid and at least one monomer containing a vinyl group and at least two acid groups selected from the group consisting of carboxylic acid groups and sulfonic acid groups.

The polymers of components a) and b) are presently used as phosphate substitutes in the cleaner concentrate of the invention that is described. Surprisingly it has emerged that the performance of a standard phosphate-containing cleaner is unattainable with any of the polymers on its own. Instead, comparable results are achievable only with a polymer mixture of components a) and b).

The polymers of component a) comprise relatively short-chain (meth)acrylic acid homopolymers, which combine inhibition of the pickling attack with a moderate cleaning effect. Conversely, the polymers of component b) are specific long-chain (meth)acrylic acid copolymers and, on account of their strongly complexing properties and the associated strong pickling attack, they act as cleaning boosters, corresponding in their cleaning performance to the phosphates used as standard.

The weight-average molar mass of the polymers of components a) and b) has been presently determined consistently by means of GPC (Gel Permeation Chromatography) with aqueous eluents. In this case the columns were calibrated using polystyrene sulfonates having a narrow molar weight distribution.

Definitions:

Presently the term "water-based" is to be understood to mean that a corresponding composition, which may contain both dissolved and dispersed constituents, such as a cleaner concentrate or cleaner, for example, consists of water to an extent of at least 50 wt %, preferably at least 55 wt %.

The terms "cleaner" and "cleaner composition" are presently used synonymously. The cleaner or cleaner composition may more particularly be a cleaner solution.

"(Meth)acrylic acid" refers presently always to methacrylic acid, acrylic acid or both. Moreover, the intention is also always to include the deprotonated form in other words the conjugate base of methacrylic acid or acrylic acid, respectively.

Accordingly, a "(meth)acrylic acid homopolymer" may be a polymer containing only methacrylic acid, only acrylic acid, or both methacrylic acid and acrylic acid as monomer units—but no other monomer units beyond these.

The same is true of a "(meth)acrylic acid copolymer": It may contain only methacrylic acid, only acrylic acid, or both methacrylic acid and acrylic acid as monomer units—but beyond these always has further monomer units, which are not methacrylic acid or acrylic acid. The at least one monomer containing a vinyl group and at least two acid groups is also intended here to encompass all deprotonated forms of the acid groups in question.

When the expression "calculated as X", where X is in each case a particular, specifically indicated chemical compound, is used in the present text in connection with concentrations by weight (wt %), this has the following meaning: When an alternative chemical compound (not X) is used, it should be used in a molar concentration as is calculated for X from the in each case specifically indicated concentration by weight (wt %), taking into account its molar mass.

The at least one (meth)acrylic acid homopolymer of component a) of the cleaner concentrate of the invention preferably comprises and more preferably is at least one acrylic acid homopolymer.

The at least one (meth)acrylic acid homopolymer of component a) preferably comprises and more preferably is at least one (meth)acrylic acid homopolymer having a weight-average molar mass in the range from 5 000 to 15 000 g/mol, particularly preferably from 6 000 to 12 000 g/mol, and especially preferably from 7 000 to 9 000 g/mol—calculated as polyacrylic acid.

"Calculated as polyacrylic acid" here is to be understood as follows: Even if the at least one (meth)acrylic acid homopolymer of component a) is not or not exclusively polyacrylic acid, it is nevertheless assumed for the purpose of calculating the concentration that all of the monomer units (100 mol %) of the at least one (meth)acrylic acid homopolymer of component a) are acrylic acid.

The at least one (meth)acrylic acid homopolymer of component a) particularly preferably comprises and more preferably is at least one acrylic acid homopolymer having a weight-average molar mass in the range from 5 000 to 15 000 g/mol, particularly preferably from 6 000 to 12 000 g/mol, and especially particularly preferably from 7 000 to 9 000 g/mol—calculated as polyacrylic acid.

The at least one (meth)acrylic acid homopolymer of component a) is added to the cleaner concentrate preferably as a salt, more preferably as an alkali metal salt, and particularly preferably as a sodium salt. The sodium salt in particular is advantageous, on account of the resulting alkalinity of the cleaner concentrate.

Especially suitable, for example, is polyacrylic acid having a weight-average molar mass of around 8 000 g/mol (available as Sokalan® PA 30 CL from BASF SE, Germany).

The at least one (meth)acrylic acid copolymer of component b) of the cleaner concentrate of the invention comprises at least one, preferably linear, copolymer of (meth)acrylic acid and at least one monomer containing a vinyl group and at least two acid groups selected from the group consisting of carboxylic acid groups and sulfonic acid groups.

The (meth)acrylic acid units on the one hand and the monomer units with the at least two acid groups on the other hand are arranged here preferably in alternating sequence. Suitable in principle, however, are corresponding block copolymers and also random copolymers as well. The at least one (meth)acrylic acid copolymer preferably contains no other monomer units, more particularly no vinyl acetate or vinyl alcohol units, and more particularly still no vinyl acetate units.

The (meth)acrylic acid units make up preferably 35 to 65 mol %, particularly preferably 40 to 50 mol %, and especially preferably 45 to 55 mol % of at least one (meth)acrylic acid copolymer of component b), while the monomer units with the at least two acid groups make up preferably 65 to 35 mol %, particularly preferably 60 to 40 mol %, and especially preferably 55 to 45 mol % of the at least one (meth)acrylic acid copolymer of component b), with the aforesaid mol % adding up preferably to 100 in each case.

According to a first preferred embodiment, the at least one (meth)acrylic acid copolymer of component b) comprises, and more preferably is, at least one—preferably alternating—copolymer of (meth)acrylic acid and at least one, preferably exactly one, monomer containing a vinyl group and at least two, preferably exactly two, carboxylic acid groups.

The at least one monomer containing a vinyl group and at least two carboxylic acid groups here is preferably selected from the group consisting of vinyldicarboxylic acids, consisting more particularly of maleic acid and fumaric acid, more preferably maleic acid.

References made presently to "maleic acid" are to be understood as also including maleic anhydride or a mixture of maleic acid and maleic anhydride. In particular, however, the compound in question is maleic acid, which forms from maleic anhydride by hydrolysis in an aqueous environment.

According to a second preferred embodiment, the at least one (meth)acrylic acid copolymer of component b) comprises, and more preferably is, at least one—preferably alternating—copolymer of (meth)acrylic acid and at least one, preferably exactly one, monomer containing a vinyl group and at least two, preferably exactly two, sulfonic acid groups.

The monomer containing a vinyl group and at least two sulfonic acid groups here is preferably selected from the group consisting of vinyl disulfonic acids.

The at least one (meth)acrylic acid copolymer of component b) preferably comprises and more preferably is at least one (meth)acrylic acid copolymer having a weight-average molar mass in the range from 55 000 to 90 000 g/mol, particularly preferably from 60 000 to 80 000 g/mol, and especially particularly preferably from 65 000 to 75 000 g/mol—calculated as poly(acrylic acid-alt-maleic acid).

"Calculated as poly(acrylic acid-alt-maleic acid)" is to be understood, accordingly, as follows: Even if the at least one (meth)acrylic acid copolymer of component b) is not or not exclusively "poly(acrylic acid-alt-maleic acid)", it is nevertheless assumed for the purpose of calculating the concentration that half (50 mol %) of the monomer units of the at least one (meth)acrylic acid copolymers of component b) is acrylic acid and the other half (50 mol %) is maleic acid.

The at least one (meth)acrylic acid copolymer of component b) particularly preferably comprises, and more preferably is, at least one—preferably alternating—copolymer of (meth)acrylic acid and at least one, preferably exactly one, monomer containing a vinyl group and at least two, preferably exactly two, carboxylic acid groups, having a weight-average molar mass in the range from 55 000 to 90 000 g/mol, particularly preferably from 60 000 to 80 000 g/mol, and especially particularly from 65 000 to 75 000 g/mol—calculated as poly(acrylic acid-alt-maleic acid).

The at least one (meth)acrylic acid copolymer of component b) is added to the cleaner concentrate preferably as a salt, more preferably as an alkali metal salt, and particularly preferably as a sodium salt. The sodium salt in particular is advantageous, on account of the resulting alkalinity of the cleaner concentrate.

Especially suitable, for example, is poly(acrylic acid-alt-maleic acid) having a weight-average molar mass of around 70 000 g/mol (available as Sokalan® CP 5 from BASF SE, Germany).

Especially suitable, correspondingly, as a polymer mixture of components a) and b) of the invention is, for example, the combination of polyacrylic acid having a weight-average molar mass of around 8 000 g/mol (available as Sokalan® PA 30 CL from BASF SE, Germany) and poly(acrylic acid-alt-maleic acid) having a weight-average molar mass of around 70 000 g/mol (available as Sokalan® CP 5 from BASF SE, Germany).

The at least one (meth)acrylic acid homopolymer of component a) is present preferably in a concentration of at least 1.0 wt %, particularly preferably of at least 1.5 wt %, and especially preferably of at least 1.7 wt %, but preferably of at most 2.5 wt %, more preferably of at most 2.0 wt %—calculated as polyacrylic acid and based on the total cleaner concentrate, while the at least one (meth)acrylic acid copolymer of component b) is present in a concentration of at least 0.5 wt %, particularly preferably of at least 0.7 wt %, and especially preferably of at least 0.9 wt %, but preferably of at most 1.5 wt %—calculated as poly(acrylic acid-alt-maleic acid) and based on the total cleaner concentrate.

The at least one (meth)acrylic acid homopolymer of component a) and the at least one (meth)acrylic acid copolymer of component b) here are present in the cleaner concentrate of the invention preferably in a weight ratio in the range from 1.0:1 to 2.5:1, more preferably from 1.3:1 to 2.0:1, particularly preferably from 1.5:1 to 1.9:1, and especially preferably from 1.7:1 to 1.8:1—calculated as polyacrylic acid:Poly(acrylic acid-alt-maleic acid).

Through the choice of a weight ratio of components a) and b) within the preferred ranges stated above, the performance—effective cleaning performance in conjunction with balanced pickling attack—of the cleaner obtainable from the cleaner concentrate of the invention can be brought even closer to the performance of a standard phosphate-containing cleaner or may even exceed said performance.

The cleaner concentrate of the invention is preferably phosphate-free, meaning by definition that no phosphates have been added to it during production. It is, however, possible, though undesirable, for the raw materials used to contain slight phosphate impurities and for the cleaner concentrate therefore likewise to contain a small amount of phosphate. With further preference, however, the cleaner concentrate contains less than 100 ppm, more preferably less than 10 ppm, particularly preferably less than 1 ppm, and especially particularly preferably less than 0.1 ppm of phosphate.

The cleaner concentrate is preferably free from silicate compounds, meaning that no silicate compounds have been added to it during production. It is, however, possible for the raw materials used to contain slight silicate impurities and for the cleaner concentrate therefore likewise to contain a small amount of silicate compounds. With further preference, however, the cleaner concentrate contains less than 100 ppm, more preferably less than 10 ppm, particularly preferably less than 1 ppm, and especially particularly preferably less than 0.1 ppm of silicate compounds.

The reason is that silicate compounds—as already observed earlier on above—tend, at a pH below 11, to precipitate and hence to lose their activity as pickling inhibitors. Moreover, they may result in crusts in the cleaning baths or in a visually destructive dried deposit on the metal surfaces to be treated.

The cleaner concentrate of the invention preferably further comprises at least one water-soluble boron compound c), which is preferably selected from the group consisting of boric acid and alkali metal borates, more particularly consisting of boric acid, sodium borate and potassium borate.

By this means it is possible, surprisingly, to exert precise control over the aggressiveness, i.e., the pickling attack of the medium, for any metallic surface to be cleaned, including for sensitive materials such as aluminum and galvanized and/or prephosphated steels. This leads in turn to an improved multimetal ability on the part of the cleaner obtainable from the cleaner concentrate of the invention, in other words to an improved multimetal treatment wherein different metallic substrates such as steel, aluminum, galvanized steels and prephosphated steels are cleaned simultaneously or in succession in the same bath.

Galvanized steels may presently be, in particular, hot dip galvanized or electrolytically galvanized steels, or steels coated with a zinc-magnesium alloy. The galvanized steels, moreover, may have undergone prephosphating. Any reference to "aluminum" is always intended to include aluminum alloys as well.

The at least one water-soluble boron compound c) is present preferably in a concentration of at least 7.5 wt %, more preferably of at least 10.0 wt %, more preferably of at least 10.5 wt %, particularly preferably of at least 12.5 wt %, and especially preferably of at least 14.0 wt %, but preferably of at most 25.0 wt %, more preferably of at most 20.0 wt %, particularly preferably of at most 17.0 wt %, and especially preferably of at most 16.0 wt %—calculated as boric acid and based on the total cleaner concentrate. By keeping within the aforesaid lower limits for the concentration of the at least one water-soluble boron compound c), it is possible to achieve further improvement in the multimetal capacity of the cleaner in question—especially in the case of a 1:50 dilution of the concentrate —, while the upper limits are dictated by the pH-dependent solubility of the water-soluble boron compounds.

The cleaner concentrate of the invention is alkaline, meaning that it has a pH of greater than 7. Its pH is preferably in the range from 9.5 to 14.0, particularly preferably from 10.5 to 14.0, and especially preferably from 11.5 to 14.0. The alkalinity may be adjusted, for example, by adding a corresponding amount of sodium or potassium hydroxide and/or of sodium or potassium carbonate to the cleaner composition of the invention.

The cleaner concentrate preferably further comprises at least one salt which, together with its conjugate acid formed in situ, forms a buffer system and ensures a stable pH of the concentrate of the invention and of the cleaner obtainable therefrom, by acting in particular to counter any drop in pH as a result of ingress of carbon dioxide from the ambient air. The at least one salt in this case is preferably sodium carbonate, sodium hydrogencarbonate, potassium carbonate and/or potassium hydrogencarbonate. The advantage in the case of the particularly preferred use of sodium and/or potassium carbonate is that the requisite alkalinity can be established in this way at the same time.

The at least one salt is present here preferably in a concentration of at least 5 wt %, more preferably of at least 7 wt %, and particularly preferably in the range from 8 to 12 wt %—calculated as potassium carbonate and based on the total cleaner concentrate.

The cleaner composition preferably further comprises at least one complexing agent which is able to complex interfering extraneous ions, especially Ca, Mg and Zn cations, and so to hold them in solution, so that they do not exert any adverse effect on the overall operation, i.e., do not contaminate the baths in the form of crusts and so lead to increased cleaning requirements, and do not lower the performance capacity of the system by reaction with cleaner constituents. The at least one complexing agent preferably comprises gluconate, which has been added to the cleaner composition preferably in the form of sodium and/or potassium gluconate.

The at least one complexing agent here is preferably present in a concentration of at least 1.0 wt %, more preferably of at least 2.0 wt %, and particularly preferably in the range from 2.5 to 3.5 wt %—calculated as sodium gluconate and based on the total cleaner concentrate.

According to an especially preferred embodiment, the cleaner concentrate of the invention comprises the following components:

a) at least 1.0 wt %, calculated as polyacrylic acid, of a (meth)acrylic acid homopolymer having a weight-average molar mass in the range from 3 000 to 19 000 g/mol, b) at least 0.5 wt %, calculated as poly(acrylic acid-alt-maleic acid), of a copolymer of (meth)acrylic acid and at least one vinyl dicarboxylic acid having a weight-average molar mass in the range from 50 000 to 100 000 g/mol, c) at least 10.0 wt %, calculated as boric acid, of sodium and/or potassium borate, d) at least 8 wt %, calculated as potassium hydroxide, of sodium and/or potassium hydroxide, e) at least 5 wt %, calculated as potassium carbonate, of sodium and/or sodium carbonate, f) at least 1.5 wt %, calculated as sodium gluconate, of a complexing agent, and g) at least 50 wt % of water, where the (meth)acrylic acid homopolymer and the copolymer of (meth)acrylic acid and at least one vinyl dicarboxylic acid are present in a weight ratio of 2.0:1 to 1.5:1 and the aforesaid wt % add up to 100 wt % in each case.

The present invention relates, moreover, to a water-based, alkaline cleaner for metallic surfaces which comprises a) at least one (meth)acrylic acid homopolymer having a weight-average molar mass in the range from 3 000 to 19 000 g/mol and b) at least one (meth)acrylic acid copolymer having a weight-average molar mass in the range from 50 000 to 100 000 g/mol, and h) at least one surfactant, where the at least one (meth)acrylic acid copolymer comprises at least one copolymer of (meth)acrylic acid and at least one monomer containing a vinyl group and at least two acid groups selected from the group consisting of carboxylic acid groups and sulfonic acid groups, and where, if the cleaner is a fresh cleaner, component a) is present in a concentration of at most 0.65 g/l, preferably in the range from 0.10 to 0.50 g/l—calculated as polyacrylic acid—and component b) is present in a concentration of at most 0.35 g/l, preferably in the range from 0.05 to 0.30 g/l—calculated as poly(acrylic acid-alt-maleic acid).

If the specified maximum concentrations of components a) and b) are exceeded, the cleaning performance is indeed satisfactory, but the pickling attack is too severe.

A "fresh cleaner" is understood presently to be a cleaner not yet brought into contact with a metallic surface. This is because contact with a metallic surface causes ions to be leached from said surface and oils and greases to be detached from said surface, with these ions, oils and greases accumulating in the cleaner bath. The bath is then said to have undergone ageing. As a result of this, the pickling attack of the cleaner decreases, which makes it possible to use component a) in a concentration of up to 1.0 g/l and component b) in a concentration of up to 0.55 g/l and yet not to obtain too high a pickling erosion.

The cleaner of the invention is obtainable from the cleaner concentrate of the invention by 1) Dilution, preferably in water and preferably by a dilution factor in the range from 1:20 to 1:100 (corresponding to 10 to 50 g of concreate for 1.0 l of cleaner), 2) by addition of at least one surfactant, preferably in the concentration range from 0.3 to 10 g/l—based on the cleaner—and also 3) optionally by adjustment of the pH with at least one acid or base.

With particular preference the dilution factor in step 1) is in the range from 1:40 to 1:60, and especially preferably from 1:45 to 1:55. Conversely, the concentration of the at least one surfactant in step 2) is particularly preferably in the range from 0.4 to 5 g/l and especially preferably from 0.5 to 3.5 g/l—based on the cleaner.

Within the cleaning operation, the at least one surfactant serves for removing any organic impurity, such as mineral oils and greases, and must therefore necessarily be added to the diluted concentrate. The at least one surfactant comprises more particularly at least one nonionic, anionic and/or cationic surfactant.

Suitable nonionic surfactants here include in particular the following:

Alkylphenol alkoxylates, especially alkylphenol ethoxylates, having C6 to C14 alkyl chains and a degree of alkoxylation of 5 to 30 mol per mole of phenol, Alkylpolyglucosides having an alkyl chain length of C8 to C22, preferably C10 to C18, and containing 1 to 20, preferably 1 to 5, glucoside units, Fatty acid amide alkoxylates, fatty acid alkanolamide alkoxylates, N-alkylglucamides or else block copolymers consisting of ethylene oxide, propylene oxide and/or butylene oxide, and Alkoxylated C8 to C22 alcohols such as fatty alcohol alkoxylates, oxo-process alcohol alkoxylates and Guerbet alcohol alkoxylates, where the alkoxylation may take place with ethylene oxide, propylene oxide, butylene oxide and/or a mixture of these, as a block copolymer or random copolymer. The alcohols preferably have 8 to 18 carbon atoms; the degree of alkoxylation ranges typically between 2 to 50 mol, preferably 3 to 20 mol, of at least one of the stated alkylene oxides per mole of alcohol. The alkylene oxide head group may additionally contain the following so-called end-capping groups as a modification: Benzyl, methyl and/or tert-butyl capping.

Depending on application, the following anionic surfactants in particular are used:

Fatty alcohol sulfates having alkyl chain lengths of 8 to 22, preferably 10 to 18, carbon atoms, for example lauryl sulfate, cetyl sulfate, myristyl sulfate, palmityl sulfate or stearyl sulfate, Alkyl ether sulfates having alkyl chain lengths of 8 to 22, preferably 10 to 18, carbon atoms, and Linear C8 to C20 alkylbenzenesulfonates or else alkanesulfonates and soaps, such as sodium or potassium salts of C8 to C24 carboxylic acids.

Cationic surfactants employed, depending on application, are in particular.

Quaternary mono- and di-(C7-C25 alkyl)dimethylammonium compounds,

Ester quats, especially quaternary esterified mono-, di- and trialkanolamines esterified with C8-C22 carboxylic acids, and C7 to C25 alkylamines, N,N-dimethyl-N-(hydroxy-C7-C25 alkyl)ammonium salts and/or imidazoline quats.

The at least one surfactant preferably comprises and more preferably is at least one nonionic surfactant. Within the majority of applications, the foaming tendency of anionic surfactants is too high, while cationic surfactants often attach to the metallic surface, and may consequently give rise to problems within the deposition of conversion coats. These disadvantages are not possessed by nonionic surfactants.

On dilution of the cleaner concentrate of the invention, even without the adjustment of the pH, a pH suitable for use in a multimetal pretreatment facility is already achieved (ready-to-use pH), and so further addition of at least one acid or base is necessary only for specialty applications.

The cleaner of the invention is preferably phosphate-free, meaning that no phosphates have been added to it. It is nevertheless possible, though undesirable, for the raw materials used to contain minor phosphate impurities and therefore for the cleaner concentrate and the cleaner produced from it to likewise include a small amount of phosphate. A small amount of phosphate in the cleaner may also be caused by substances dissolved from the cleaned metal surfaces, particularly if those surfaces have undergone prior phosphating. More preferably, however, the cleaner comprises less than 200 ppm, particularly preferably less than 20 ppm, and especially preferably less than 2 ppm of phosphate.

The cleaner is preferably free from silicate compounds, meaning that no silicate compounds have been added to it during production. It is possible, however, for the raw materials used to contain minor silicate impurities and for the cleaner therefore likewise to include small amount of silicate compounds. More preferably, however, the cleaner contains less than 100 ppm, more preferably less than 10 ppm, particularly preferably less than 1 ppm, and especially preferably less than 0.1 ppm of silicate compounds.

The cleaner of the invention preferably further comprises at least one water-soluble boron compound c), which is preferably selected from the group consisting of boric acid and alkali metal borates, more particularly consisting of boric acid, sodium borate and potassium borate.

The at least one water-soluble boron compound c) is present preferably in a concentration of at least 0.15 wt %, more preferably of at least 0.20 wt %, more preferably of at least 0.21 wt %, particularly preferably of at least 0.25 wt %, and especially preferably of at least 0.28 wt %, but preferably of at most 0.50 wt %, more preferably of at most 0.40 wt %, particularly preferably of at most 0.34 wt %, and especially preferably of at most 0.32 wt %—calculated as boric acid and based on the total cleaner concentrate. By complying with the above-stated lower limits for the concentration of the at least one water-soluble boron compound c) is possible to achieve further improvements in the multimetal capacity of the cleaner, while the upper limits are dictated by the pH-dependent solubility of the water-soluble boron compounds in the concentrate in question—more particularly for a 1:50 dilution of the cleaner from the concentrate.

Further advantageous embodiments and features of the cleaner of the invention have already been described earlier on above in connection with the cleaner concentrate of the invention.

The present invention further relates to a process for anticorrosive treatment of a metallic surface, wherein the surface is contacted in succession will the following compositions:

i) at least one water-based, alkaline cleaner for metallic surfaces, which comprises a) at least one (meth)acrylic acid homopolymer having a weight-average molar mass in the range from 3 000 to 19 000 g/mol, b) at least one (meth)acrylic acid copolymer having a weight-average molar mass in the range from 50 000 to 100 000 g/mol, and h) at least one surfactant, where the at least one (meth)acrylic acid copolymer comprises at least one copolymer of (meth)acrylic acid and at least one monomer containing a vinyl group and at least two acid groups selected from the group consisting of carboxylic acid groups and sulfonic acid groups, and where, if the cleaner is a fresh cleaner, component a) is present in a concentration of at most 0.65 g/l, preferably in the range from 0.10 to 0.50 g/i—calculated as polyacrylic acid—and component b) is present in a concentration of at most 0.35 g/l, preferably in the range from 0.05 to 0.30 g/l—calculated as poly(acrylic acid-alt-maleic acid), ii) a first water-based rinsing composition, iii) optionally a second water-based rinsing composition, iv) a water-based acidic conversion composition, v) optionally a third water-based rinsing composition, and vi) a water-based composition comprising a (meth)acrylate-based and/or epoxy-based cathodic or anodic electrocoat material and/or a water-based or solvent-based wet or powder coating material.

The contacting of the metallic surface in succession with the compositions i) to vi) is not intended to rule out its being contacted, beforehand, afterward or inbetween, with at least one further, preferably water-based, composition, such as an activating composition or a passivating composition—as described later on below in the context of phosphating—or with a further rinsing composition, or its being subjected afterward to at least one drying—in a drying oven, for example—or provided with further coating films such as surfacer, topcoat and clearcoat (automobile paint system).

A feature of the process of the invention is that, while operating without the use of a phosphate-containing cleaner composition, it nevertheless produces corrosion control and paint adhesion outcomes which are comparable to those obtained when using a phosphate-containing cleaner composition.

The contacting of the metallic surface with the at least one cleaner of the invention in step i), combining a balanced pickling attack with effective cleaning performance, prepares the metallic surface optimally for any kind of conversion treatment. Thus the acidic conversion composition in step iv) may be a conversion coating not only for trication phosphating but also one for nickel-free zinc phosphating, one for the application of an organosilane-based thin-film coating, or a passivating composition.

The at least one cleaner in step i) preferably further comprises at least one water-soluble boron compound c), which is preferably selected from the group consisting of boric acid and alkali metal borates, more particularly consisting of boric acid, sodium borate and potassium borate. As already observed earlier on above, it is possible by this means to exert exact control over the aggressiveness for each metallic surface to be cleaned and subsequently coated, even for sensitive materials. The metallic surface therefore preferably comprises at least one sensitive material selected from the group of aluminum, galvanized steels and prephosphated steels.

The addition of at least one water-soluble boron compound c) results—as likewise already observed—in an improved multimetal capacity. The metallic surface therefore preferably comprises at least two metallic materials selected from the group consisting of steel, aluminum, galvanized steels and prephosphated steels, more particularly selected from the group consisting of aluminum, galvanized steels and prephosphated steels. With further preference the metallic surface comprises not only aluminum but also at least one galvanized and/or prephosphated steel, with particular preference both aluminum and at least one galvanized and also at least one prephosphated steel.

According to a first preferred embodiment, the acidic conversion composition in step iv) is a composition for nickel-free zinc phosphating which as well as zinc ions and manganese ions also comprises phosphate ions and to which no nickel ions have been added.

In the case of nickel-free zinc phosphating and in the case of trication phosphating, in which zinc, manganese and nickel ions and also phosphate ions are employed, the metallic surface is contacted before step iv) in general additionally with an aqueous activating composition which preferably comprises particles composed of crystals of zinc phosphate and/or titanium phosphate. This facilitates the deposition of a phosphate crystal layer in step iv).

After the phosphating in step iv), the metallic surface may further be contacted with an aqueous passivating composition. This may be advantageous in particular for surfaces which as well as regions containing zinc and/or iron also contain regions containing aluminum. In this way it is possible to achieve further improvements in corrosion control and also paint adhesion for the painted surface. Said passivating composition preferably comprises at least one compound of titanium, of zirconium and/or of hafnium, more particularly at least one fluorocomplex of the stated elements, and also, preferably, at least one organosilane—including hydrolysis and condensation products thereof—as well.

According to a second preferred embodiment, the acidic conversion composition in step iv) is a composition for applying an organosilane-based thin-film system, said composition comprising not only at least one organosilane—hydrolysis and condensation products thereof included—but also, optionally, at least compound of titanium, of zirconium and/or of hafnium.

In contrast to the situation with phosphating, the cleaner composition of the invention, in combination with an organosilane-based thin-film system, in fact leads to better corrosion control outcomes than a standard phosphate-containing cleaner, particularly when the cleaner composition is phosphate-free. The at least one cleaner of the invention in step i) and accordingly the cleaner concreate of the invention as well are therefore preferably phosphate-free, especially in the case of the subsequent application of an organosilane-based thin-film system.

According to a third preferred embodiment, the acidic conversion composition in step iv) comprises a passivating composition which as well as at least one compound of titanium, of zirconium and/or of hafnium, more particularly at least one fluorocomplex of the stated elements, optionally further comprises at least one organosilane—hydrolysis and condensation products included—as well.

Advantageous embodiments and features of the cleaner of the invention used in step i) have already been described earlier on above in connection with the cleaner concentrate of the invention and with the cleaner of the invention.

The present invention relates, moreover, to an anticorrosively treated metallic surface which is obtainable with the process of the invention, and also to the use thereof in the sector of the metalworking industries in which conversion processes are employed for the purpose of the pretreatment, particularly in the sector of the automobile, automotive components supply or general industry.

The present invention is illustrated below by working examples, which should not be understood as imposing any limitation, and also comparative examples.

EXAMPLES i) Determination of Picking Erosion:

Principle of Measurement:

The pickling erosion indicates the weight loss of the bare metal during a cleaning step. It is tested by immersing a defined standard sheet of AA6014 aluminum with dimensions of 105×190 mm (Gardobond® test sheet, Chemetall GmbH, Germany) into the solution under test—in this case, corresponding cleaner solution. The loss of mass is then determined gravimetrically using an analytical balance. The test in this case was confined to aluminum surfaces, as they are the most sensitive to a pickling attack.

Preparation of Test Sheets:

The test sheets were first preliminarily degreased with petroleum spirit in order to remove any kind of organic impurity. This allows the direct attack of the test solution on the base substrate itself to be assessed and compared.

Measurement of Pickling Erosion:

The mass of the respective test sheet having undergone preliminary degreasing was determined on an analytical balance. Directly afterwards the test sheet was immersed for 10 minutes at 55° C. in a 31 beaker containing the corresponding test solution. Stirring took place with a 40 mm magnetic stirrer at the bottom of the beaker with a speed of 500 rpm.

After 10 minutes, the test sheet was withdrawn from the test solution, rinsed with fully demineralized (FD) water, and dried using compressed air. The loss of weight was then determined on the analytical balance.

In each case a reference was tested in parallel, to allow comparison of the values obtained.

ii) Determination of Minimum Cleaning Time:

Principle of Measurement:

The minimum cleaning time (MCT) indicates the minimum duration of cleaning step that is necessary in order to remove organic impurities from a standard sheet of 1.0312 steel with dimensions of 105×190 mm (test sheet) under constant conditions. The quality of the cleaning must attain a certain minimum value, which is determined from the percentage water wetting of the metal surface. For this case, steel surfaces were looked at exclusively, as they are typically the surfaces that are most difficult to degrease.

Preparation of Test Sheets:

The test sheets used had a constant oil burden (1.7+/−0.2 $g/m^2$). The purpose of this was the compatibility of the results.

Measurement of Minimum Cleaning Time:

To determine the minimum cleaning time, the respective test sheet was immersed for 1 minute at 55° C. in a 3 l beaker containing the corresponding cleaner solution. Stirring took place with a 40 mm magnetic stirrer at the bottom of the beaker with a speed of 500 rpm. The test sheet was subsequently rinsed with reciprocal movements (around 15 back-and-forth movements) in the immersive rinse, with the sheet always being withdrawn completely from the rinsing water, and was held vertically for assessment after 10 seconds (in order to rule out false wetting).

The minimum cleaning time is reached when the water wetting of the surface amounts to at least 95%, i.e., when there is a coherent water film. If this condition is not met, the test sheet is immersed in the cleaner solution for a further minute, as described above, and then rinsed in the immersive rinse. This is repeated until the condition is met.

The number of repetitions is added up and, as a control, an identical oil test sheet is left in the cleaner solution for the entire time. This is necessary since the intermediate rinsing steps improve the cleaning performance. If the sheet is wetted to an extent of at least 95% after the added-up time, this time is recorded as the MCT. If this is not the case, cleaning and rinsing are repeated in steps of 1 minute until the surface is at least 95% water-wettable without intermediate rinsing steps. This time is then the MCT.

iii) Investigation of Different Cleaner Solutions:

In order to test the effect of different polymers in terms of pickling erosion and MCT, a standard cleaner concentrate (VB1) having a pH of 12.9 was first prepared as reference, this concentrate containing FV water and also the following components:

| Component | % by weight |
|---|---|
| Potassium hydroxide | 12.5 |
| Boric acid | 14.5 |
| Potassium carbonate | 10 |
| Sodium gluconate | 3 |

By adding the polymers below to this standard, different cleaner concentrates were obtained (VB2 to VB6 and also B1):

| Polymer | Chemical designation | Weight-average molar weight [g/mol] |
|---|---|---|
| Polymer 1 | Polyacrylic acid | 4.000 |
| Polymer 2 | Polyacrylic acid | 8.000 |
| Polymer 3 | Polyacrylic acid | 20.000 |
| Polymer 4 | Poly(acrylic acid-alt-maleic acid) | 70.000 |

Furthermore, a phosphate-containing standard cleaner concentrate (VB7) having a pH of greater than 11.5 was prepared as a reference, containing FV water and also the following components:

| Component | % by weight |
|---|---|
| Potassium hydroxide | 31.5 |
| Boric acid | 17.0 |
| Phosphoric acid | 4.0 |

All of the cleaner concentrates were subsequently diluted by a factor of 1:50 (corresponding to 20 g of concentrate for 1.0 l of cleaner) with FV water and admixed with 2 g/l of an ethylene/propylene oxide fatty alcohol, in other words a nonionic surfactant.

Additionally the pH of all of the cleaner concentrates was adjusted to 10.5 by addition of boric acid or aqueous potassium hydroxide solution.

The cleaner solutions obtained were then tested for pickling erosion and MCT as described earlier on above—cf. i) and ii). The results obtained accordingly are collated in Tab. 1 (mean values for at least three sheets in each case, i.e., n≥3).

TABLE 1

| (Comparative) Example | Polymer | Concentration of the polymer in the concentrate [% by wt.] | Pickling erosion [$g/m^2$] | MCT [min] |
|---|---|---|---|---|
| VB1 | none | 0 | 0.14 | 10 |
| VB2 | Polymer 1 | 7.0 | 0.68 | 5 |
| VB3 | Polymer 2 | 7.0 | 0.83 | 4 |
| VB4 | Polymer 3 | 7.0 | 1.45 | 3 |
| VB5 | Polymer 4 | 7.0 | 1.15 | 3 |
| B1 | Polymer 2 + Polymer 4 (1.8:1.0 *) | 2.8 | 0.78 | 2 |
| VB6 | Polymer 2 + Polymer 4 3.5:2.0 *) | 5.5 | 1.14 | 3 |
| VB7 | none | 0 | 0.35 | 3 |

*) Weight ratio of the two polymers

The experimental results show that by adding a polymer—polyacrylic acid or poly(acrylic acid-alt-maleic acid—it is possible to achieve a large improvement in the cleaning performance (see MCT; VB2 to VB6 and also 1B1 vs. V1B1). At the same time the aggressiveness of the medium on aluminum is increased (see pickling erosion). It is apparent that in the case of polyacrylic acid, the effect of adding the polymer becomes greater in terms of pickling attack and MCT as the chain length, and hence the molar mass, increases (VB2 to VB34).

It was also found that no polymer on its own was able to achieve the performance of a standard phosphate-containing cleaner in terms of pickling erosion and MCT. Only the cleaner solution of the invention (1B1), comprising a specific mixture of two polymers, is capable of achieving or even exceeding the cleaning performance of a phosphate-containing cleaner (VB7)—MCT below 4 minutes—with a generally low service concentration and a balanced pickling attack—pickling erosion up to 0.8 g/m$^2$. If the concentration of the two polymers is doubled, however, the cleaning performance continues to be satisfactory, but the pickling attack is too severe (VB6).

iv) Determination of Multimetal Capacity:

The multimetal capacity of the various solutions was likewise determined using the two above-described measurement principles of pickling erosion (see Tab. 2: n≥3) and MCT (see Tab. 3: n≥3), but using in each case a specific VDA 230-213 testing apparatus. The tests in question were conducted on the following four substrates encountered in the automobile industry: Cold-rolled steel (CRS), hot-dipped-galvanized steel (HDG), prephosphated electrogalvanized steel (ZEP), and automotive-grade aluminum (AA6014).

TABLE 2

| (Comparative) Example | Polymer | Concentration of the polymer [% by wt.] | Pickling erosion [g/m$^2$] CRS | HDG | ZEP | AA6014 |
|---|---|---|---|---|---|---|
| VB8 | Polymer 2 | 3.5 | 0.0. | 0.02 | 0.09 | 1.61 |
| B1 | Polymer 2 + Polymer 4 1.8:1.0 *) | 2.8 | 0.0 | 0.02 | 0.18 | 0.78 |
| VB7 | None | 0 | 0.0 | 0.01 | 0.03 | 0.35 |

*) Weight ratio of the two polymers

TABLE 3

| (Comparative) Example | Polymer | Concentration of the polymer [% by wt.] | MCT [min] CRS | HDG | ZEP | AA6014 |
|---|---|---|---|---|---|---|
| VB8 | Polymer 2 | 3.5 | 6 | 3 | 3 | 7 |
| B1 | Polymer 2 + Polymer 4 1.8:1.0 *) | 2.8 | 5 | 2 | 2 | 5 |
| VB7 | None | 0 | 7 | 10 | 5 | 10 |

*) Weight ratio of the two polymers

As apparent from Tab. 2, the pickling attack in the case of the cleaner solution of the invention (B1) is in fact somewhat higher by comparison with a phosphate-containing cleaner (VB7). In contrast to a cleaner solution based only on one polymer, however, with a lower polymer concentration (VB8), values obtained on aluminum (AA6014) are also values acceptable for an ongoing operation, thus demonstrating the multimetal capacity of the cleaning solution of the invention.

Tab. 3 shows that for the cleaner solution of the invention (B1), the minimum cleaning time (MCT), i.e., the cleaning performance, is better particularly in comparison to a phosphate-containing cleaner (VB7), but also to a cleaner solution based only on one polymer, with a lower polymer concentration (VB8), on each of the substrates used in a multimetal operation.

As a result of the use of the specific VDA 230-213 testing apparatus, the outcome obtained for pickling erosion and for MCT are higher by comparison with the results ascertained manually, in Tab. 1, this being attributable to the lower circulation/bath movement within the apparatus.

In the cleaner solution B1 of the invention, moreover, the borate concentration was varied, in order to ascertain the optimum in terms of pickling attacks within a multimetal operation. The cleaner solutions thus prepared (B1-1 to B1-3) were then tested as described earlier on above (cf. i) in relation to their pickling erosion on the following three substrates encountered in the automobile industry: Automotive-grade aluminum (AA6014), hot-dipped-galvanized steel (HDG) and electrogalvanized steel (MBZE). The metal sheets used for this purpose each underwent preliminary degreasing with an aqueous surfactant solution.

The results obtained accordingly are collated in Tab. 4 (mean values of in each case at least 3 sheets, i.e. n≥3).

TABLE 4

| (Comparative) Example | Polymer | Concentration of boric acid in the concentrate [% by wt.] | Pickling erosion [g/m$^2$] AA6014 | Pickling erosion [g/m$^2$] HDG | Pickling erosion [g/m$^2$] MBZE |
|---|---|---|---|---|---|
| B1 | Polymer 2 + Polymer 4 (1.8:1.0 *) | 14.5 | 0.32 | 0.03 | 0.04 |
| B1-1 | Polymer 2 + Polymer 4 (1.8:1.0 *) | 5.0 | 2.9 | 0.05 | 0.08 |
| B1-2 | Polymer 2 + Polymer 4 (1.8:1.0 *) | 10.0 | 2.7 | 0.04 | 0.07 |
| B1-3 | Polymer 2 + Polymer 4 (1.8:1.0 *) | 16.5 | 0.06 | 0.03 | 0.02 |

*) Weight ratio of the two polymers

As can be seen from looking at the experimental results for the cleaner solution 1B1 of the invention and also its variants 1B1-1 to 1B1-3, the pickling attack of aluminum (AA6014) is in the desired low range at a concentration of 14.5 and also 16.5 wt % boric acid in the concentrate—i.e., a concentration of 0.29 and 0.33 wt %, respectively, for a dilution of 1:50 in the cleaner solution. In this way, then, it is possible for all the substrates tested—including aluminum—to undergo optimal treatment in combination.

v) Compatibility with Conversion Treatments:

The compatibility of the cleaner solution of the invention (B1) with known conversion treatments was examined on the basis of an organosilane-based thin-film coating and also a trication phosphating.

To investigate the effect of the cleaner solution of the invention (B1), the corresponding polymers were added in quantities larger than operationally usual—of the kind which may enter a conversion bath as a result of cleaner medium being entrained by components—to the two conversion baths (1B2 and 1B3). Thereafter the following substrates encountered in the automobile industry—cold-rolled steel (CRS), hot-dipped-galvanized steel (HDG) and aluminum (AA6014)—were pretreated in a standard treatment procedure—organosilane and zirconium compound or zinc manganese nickel phosphate (phosphating time: 180 s) following prior activation with zinc phosphate (activation time: 60 s).

The effect of the polymers was assessed by determination of coat weight (CW) by X-ray fluorescence analysis (XRF) and also scanning electron microscopy (SEM) images of the surface structure of the resulting conversion coat. The coat weights determined—calculated as zirconium metal (Zr)—for the organosilane-based thin-film coating are collated in Tab. 5 (n≥3).

TABLE 5

| (Comparative) Example | Polymer | Concentration of the polymer [g/l] | CW of Zr [mg/m²] CRS | HDG | AA6014 |
|---|---|---|---|---|---|
| VB9 | None | 0 | 45 | 56 | 48 |
| B2 | Polymer 2 + Polymer 4 1.8:1.0 *) | 0.48 | 48 | 52 | 51 |
| B3 | Polymer 2 + Polymer 4 1.8:1.0 *) | 0.96 | 52 | 50 | 54 |

*) Weight ratio of the two polymers

The deviations attained within the different variants (VB9, B2 and B33) are situated within the possible error tolerance of the CW determination. The SEM images of the surface structure of the conversion coat showed no peculiarities in any case. The polymers used in the invention therefore have no adverse effects on the optimal development of coatings of an organosilane-based thin-film system, and are therefore compatible with said system.

The coat weights determined—calculated in each case as $Zn_3(PO_4)_2.4H_2O$—are collated for the zinc phosphate activation and for the subsequent trication phosphating in Tab. 6 and, respectively, Tab. 7 (in each case n≥3).

TABLE 6

| (Comparative) Example | Polymer | Concentration of the polymer [g/l] | CW of the zinc phosphate coat [g/m²] CRS | HDG | AA6014 |
|---|---|---|---|---|---|
| VB10 | None | 0 | 2.9 | 2.8 | 3.2 |
| B4 | Polymer 2 | 0.01 | 2.9 | 2.7 | 3.0 |
| B5 | Polymer 4 | 0.006 | 2.8 | 2.7 | 2.8 |

TABLE 7

| (Comparative) Example | Polymer | Concentration of the polymer [g/l] | CW of the zinc phosphate coat [g/m²] CRS | HDG | AA6014 |
|---|---|---|---|---|---|
| VB10 | None | 0 | 2.0 | 2.1 | 4.0 |
| B4 | Polymer 2 | 0.01 | 2.7 | 2.8 | 4.2 |
| B5 | Polymer 4 | 0.006 | 2.3 | 2.2 | 4.6 |

The coat weights obtained show that the two polymers exhibit no effects at all on the zinc phosphate activation (cf. Tab. 6) and only minor influences on the trication phosphating (cf. Tab. 7) (B34 and B5 vs. VB10), and these effects can be compensated in the ongoing operation by adaptation to the phosphating parameters. The SEM images of the surface structure of the trication conversion coat show no peculiarities.

It has therefore been possible to demonstrate the compatibility of the cleaner solution of the invention not only with organosilane-based thin-film coatings but also with trication phosphating systems.

vi) Corrosion Behavior in Organosilane-Based Thin-Film Coating:

In order to investigate the effect of the cleaner solution of the invention 1B1 on the corrosion behavior, the material HDG in sheet form was treated within a standardized process.

Process: 1.) Spray cleaning, 60 seconds
2.) Immersion cleaning, 180 seconds
3.) Immersive rinse, 30 seconds
4.) Immersive conversion, 180 seconds
5.) Immersive rinse, 30 seconds
6.) Drying with compressed air Cleaning steps 1.) and 2.) were carried out using the phosphate-free cleaner solution B1 of the invention at a dilution of 1:50 from the concentrate and of 2 g/l of an ethylene/propylene oxide fatty alcohol. For comparison, two standard phosphate-containing cleaners (VB11 and VB12) were also tested.

For the conversion in step 4.) an organosilane based thin-film system (Chemetall, Germany) was used. After step 6.), the treated sheets were tested for paint adhesion and corrosion by means of a cyclical corrosion test (VDA 621-415) customary within the automobile sector.

The results for corrosive undermining and also for paint adhesion after stone chipping are collated in in Tab. 8 (in each case n 2 3).

It is apparent that the phosphate-free cleaner solution B1 of the invention in combination with an organosilane-based conversion system significantly improves both the corrosion behavior and the paint adhesion properties of the surface by comparison with a standard phosphate-containing cleaner (VB11 and VB12).

TABLE 8

| (Comparative) Example | Concentration of cleaner [g/l] | pH | Corrosive undermining [mm] | Characteristic stone chip value |
|---|---|---|---|---|
| VB11 | 15 | 10.5 | 3.0 | 3.0 |
| VB12 | 15 | 10.0 | 2.5 | 2.5 |
| B1 | 20 | 10.0 | 2.0 | 2.0 |
| B1 | 20 | 9.5 | 1.0 | 1.0 |

The invention claimed is:

1. A water-based, alkaline cleaner concentrate for producing a cleaner for metallic surfaces, which comprises a) at least one (meth)acrylic acid homopolymer, wherein the at least one (meth)acrylic acid homopolymer is polyacrylic acid having a weight-average molar mass in the range from 5000 to 15000 g/mol and b) at least one (meth)acrylic acid copolymer, wherein the at least one (meth)acrylic acid copolymer is poly (acrylic acid-alt-maleic acid) having a weight-average molar mass in the range from 55000 to 90000 g/mol, wherein the at least one (meth)acrylic acid homopolymer of component a) and the at least one (meth)acrylic acid copolymer of component b) are present in a weight ratio in the range from 1.0:1 to 2.5:1; and wherein the at least one (meth)acrylic acid homopolymer of component a) is present in a concentration of at least 1.0 wt % but of at most 2.5 wt %, whereas the at least one (meth)acrylic acid copolymer of component b) is present in a concentration of at least 0.5 wt % but of at most 1.5 wt %.

2. The cleaner concentrate according to claim 1, which is phosphate-free.

3. The cleaner concentrate according to claim 1, which further comprises at least one water-soluble boron compound c).

4. The cleaner concentrate according to claim 3, wherein the at least one water-soluble boron compound c) is present in a concentration of at least 10.5 wt %, calculated as boric acid.

5. A water-based, alkaline cleaner for metallic surfaces, which comprises the water-based, alkaline cleaner concentrate of claim 1 and optionally at least one nonionic surfactant;

wherein, if the cleaner is a fresh cleaner, component a) is present in a concentration of at most 0.65 g/l, calculated as polyacrylic acid and component b) is present in a concentration of at most 0.35 g/l, calculated as poly (acrylic acid-alt-maleic acid).

6. A process for anticorrosive treatment of a metallic surface, which comprises contacting the surface in succession with the following compositions:

i) at least one water-based, alkaline cleaner according to claim 5, ii) a first water-based rinsing composition, iii) optionally a second water-based rinsing composition, iv) a water-based acidic conversion composition, v) optionally a third water-based rinsing composition, and vi) a water-based composition comprising a (meth)acrylate-based and/or epoxy-based cathodic or anodic electrocoat material and/or a water-based or solvent-based wet or powder coating material.

7. The process according to claim 6, wherein the acidic conversion composition in step iv) comprises a nickel-free zinc phosphating composition which, as well as zinc ions and manganese ions, further comprises phosphate ions, and to which no nickel ions have been added.

8. The process according to claim 6, wherein the acidic conversion composition in step iv) comprises a composition for applying an organosilane-based thin-film system which, as well as at least one organosilane, its hydrolysis and condensation products included, optionally further comprises at least one titanium compound, zirconium compound and/or hafnium compound.

9. The cleaner concentrate according to claim 1, wherein the at least one (meth)acrylic acid homopolymer of component a) comprises at least one (meth)acrylic acid homopolymer having a weight-average molar mass in the range from 6 000 to 12 000 g/mol, calculated as polyacrylic acid.

10. The cleaner concentrate according to claim 1, wherein the at least one (meth)acrylic acid copolymer of component b) comprises at least one (meth)acrylic acid copolymer having a weight-average molar mass in the range from 60 000 to 80 000 g/mol, calculated as poly(acrylic acid-alt-maleic acid).

11. The cleaner concentrate according to claim 1, which further comprises at least one water-soluble boron compound c) selected from the group consisting of boric acid and alkali metal borates.

* * * * *